(12) United States Patent
Hartmann et al.

(10) Patent No.: US 7,475,887 B2
(45) Date of Patent: Jan. 13, 2009

(54) PALLET JACK

(75) Inventors: Fred O. Hartmann, Thief River Falls, MN (US); Allen C. Aaseby, Thief River Falls, MN (US)

(73) Assignee: Grand Steer Inc., Thief River Falls, MN (US)

( * ) Notice: Subject to any disclaimer, the term of this patent is extended or adjusted under 35 U.S.C. 154(b) by 0 days.

(21) Appl. No.: 11/929,299

(22) Filed: Oct. 30, 2007

(65) Prior Publication Data
US 2008/0042381 A1 Feb. 21, 2008

Related U.S. Application Data

(60) Continuation of application No. 11/737,582, filed on Apr. 19, 2007, now Pat. No. 7,427,075, which is a division of application No. 11/012,431, filed on Dec. 15, 2004, now Pat. No. 7,226,060.

(51) Int. Cl.
*B62D 21/14* (2006.01)
*B62D 33/08* (2006.01)
*B62D 61/12* (2006.01)
*B60P 1/02* (2006.01)
*B60P 1/00* (2006.01)
*B66F 9/00* (2006.01)

(52) U.S. Cl. .................. 280/43.12; 280/641; 280/38; 280/43.17; 280/651; 414/495; 414/723; 414/705; 414/530; 414/533; 414/785; 414/685

(58) Field of Classification Search ............. 280/43.12, 280/641, 38, 43.17, 651, DIG. 1; 414/495, 414/723, 705, 530, 533, 785, 685
See application file for complete search history.

(56) References Cited

U.S. PATENT DOCUMENTS

| 575,390 | A | 1/1897 | Burnett |
|---|---|---|---|
| 2,178,647 | A | 11/1939 | Raymond |

(Continued)

OTHER PUBLICATIONS

Non-Final Office Action of U.S. Appl. No. 11/012,431, filed Mar. 2, 2007.

(Continued)

*Primary Examiner*—Christopher P Ellis
*Assistant Examiner*—John R Olszewski
(74) *Attorney, Agent, or Firm*—DuFault Law Firm, P.C.; Dustin R. DuFault

(57) ABSTRACT

A pallet jack having first and second turn radii includes a support frame having a first end and a second end. The support frame is positionable between a raised position and a lowered position. A main wheel connects to the support frame proximate the first end while a first extensible wheel connects to the support frame proximate the second end. The distance between the main wheel and the extensible wheel define the first turn radius when the support frame is in the raised position. A ground engaging device attaches to the support frame between the main wheel and the first extensible wheel. Positioning the support frame towards the lowered position, the ground engageable device engages the ground and the extensible wheel disengages the ground. The second turn radius is thereby defined by the distance between the main wheel and the ground engaging device, which is less than the first turn radius.

16 Claims, 5 Drawing Sheets

U.S. PATENT DOCUMENTS

| | | | |
|---|---|---|---|
| 2,361,544 A | | 10/1944 | Hastings, Jr. |
| 2,417,394 A | * | 3/1947 | Framhein .................... 254/2 B |
| 2,422,538 A | * | 6/1947 | Framhein ................. 280/43.12 |
| 2,550,548 A | * | 4/1951 | Framhein .................. 254/10 C |
| 2,598,151 A | * | 5/1952 | Warshaw .................... 254/2 B |
| 2,623,756 A | | 12/1952 | Elliot |
| 2,727,752 A | | 12/1955 | Gold |
| 2,734,752 A | | 2/1956 | Boylan |
| 3,260,534 A | | 7/1966 | Knights |
| 3,372,769 A | | 3/1968 | Jung |
| 3,421,775 A | | 1/1969 | Dugelay |
| 4,589,669 A | | 5/1986 | Kedem |
| 5,354,080 A | * | 10/1994 | Jones ...................... 280/43.12 |
| 5,403,024 A | | 4/1995 | Frketic |
| 5,516,128 A | | 5/1996 | Nakade |
| 6,343,907 B1 | | 2/2002 | Schalmath |
| D464,785 S | | 10/2002 | Gallagher |
| 6,742,790 B2 | | 6/2004 | Seagraves |
| 7,296,806 B2 | * | 11/2007 | Borrmann ................ 280/43.12 |

OTHER PUBLICATIONS

Amendment filed in response to Non-Final Office Action of U.S. Appl. No. 11/012,431, filed Mar. 15, 2007.

Non-Final Office Action of U.S. Appl. No. 11/737,582, filed Sep. 14, 2007.

Notice of Allowance for U.S. Appl. No. 11/737,582 mailed on Jul. 3, 2008.

Final Office Action of related U.S. Appl. No. 11/732,582 mailed on Mar. 17, 2008.

Amendment After Final filed in related U.S. Appl. No. 11/737,582 on Jun. 17, 2008.

* cited by examiner

PALLET JACK

CROSS-REFERENCE TO RELATED APPLICATION(S)

This application is a Continuation of U.S. patent application Ser. No. 11/737,582 entitled STEERING DEVICE FOR PALLET TRUCK filed on 19 Apr. 2007, which was a Divisional of U.S. patent application Ser. No. 11/012,431 entitled STEERING DEVICE FOR PALLET TRUCK, now U.S. Pat. No. 7,226,060, filed on 15 Dec. 2004, both of which are hereby incorporated herein by reference.

BACKGROUND OF INVENTION

The present invention generally relates to pallet jacks. In particular, the present invention relates to a device for decreasing a turning radius of a pallet jack.

In the art of material handling, pallets jacks typically include wheeled devices intended for the manual lifting of a pallet, with a load resting thereon, to transport the pallet and load from one work area to another. U.S. Pat. No. 4,589,669 discloses an exemplary pallet jack, or hydraulic pallet truck. Pallet jacks typically include forked support arms upon which extensible rollers are mounted at terminal ends. The opposing ends of the forked support arms are typically connected to one another and attached in some fashion to a pivotal wheel with a hydraulic lift. The pivotal wheel allows the user to steer the pallet jack when either pushing or pulling the pallet jack. The hydraulic lift is operatively connected the wheel and the extensible rollers to raise and lower the support arms to engage and transport the pallet or to disengage the pallet jack from the pallet.

Due to the relatively heavy loads pallet jacks are intended to transport, and the size of the pallets themselves, the length of the forked arms are designed to provide the greatest support and stability when in contact with the pallets. Therefore, to maximize stability, the roller of each fork is terminally positioned on each fork to maximize the distance each roller is from the main wheel. However, by positioning the rollers at such a distance from the main wheel, the pallet jack is sometimes difficult to steer in tight or crowded work areas due to the fact that the turning radius of the pallet jack is defined by the distance between the main wheel and the rollers. The turning radius of the pallet jack becomes especially problematic when the work area does not provide for adequate space, as is the case with crowded warehouses or storerooms. Also, because the steerable wheel is positioned at one end and the rollers are positioned at the opposite end, the center of curvature of the pallet jack is virtually positioned between the rollers at the terminal ends of the forked arms. Therefore, positioning the forked arms to engage the pallet is made difficult because very little lateral movement occurs at the terminal ends of the forked arms relative to lateral movement made at the opposing end having the main steering wheel.

BRIEF SUMMARY OF INVENTION

The present invention is a device attachable to a pallet jack for facilitating steering and positioning of the pallet jack. The device includes a housing structure having at least one roller partially disposed therein for contacting the ground. The housing structure attaches to an underside of a support member by way of a clamping mechanism. The clamping mechanism includes a spacer plate disposed between the housing structure and a locking plate. A threaded fastener connects and urges the locking plate and the housing structure together to clamp against a flange connected to the support member. The pallet jack is positionable between a raised position and a lowered position by means of a hydraulic mechanism. The hydraulic mechanism is connected to a main wheel and extensible rollers terminally positioned on the support member. While in the raised position, the extensible rollers and the main wheel contact the ground, defining a first turning radius of the pallet jack. Upon lowering the pallet jack, the rollers of the steering device engage the ground while the extensible rollers disengage the ground. Because the steering device is positioned between the main wheel and the terminally positioned extensible rollers, the resulting turning radius of the pallet jack is decreased thus allowing for better control and positioning of the pallet jack.

DETAILED DESCRIPTION

Figure 1:
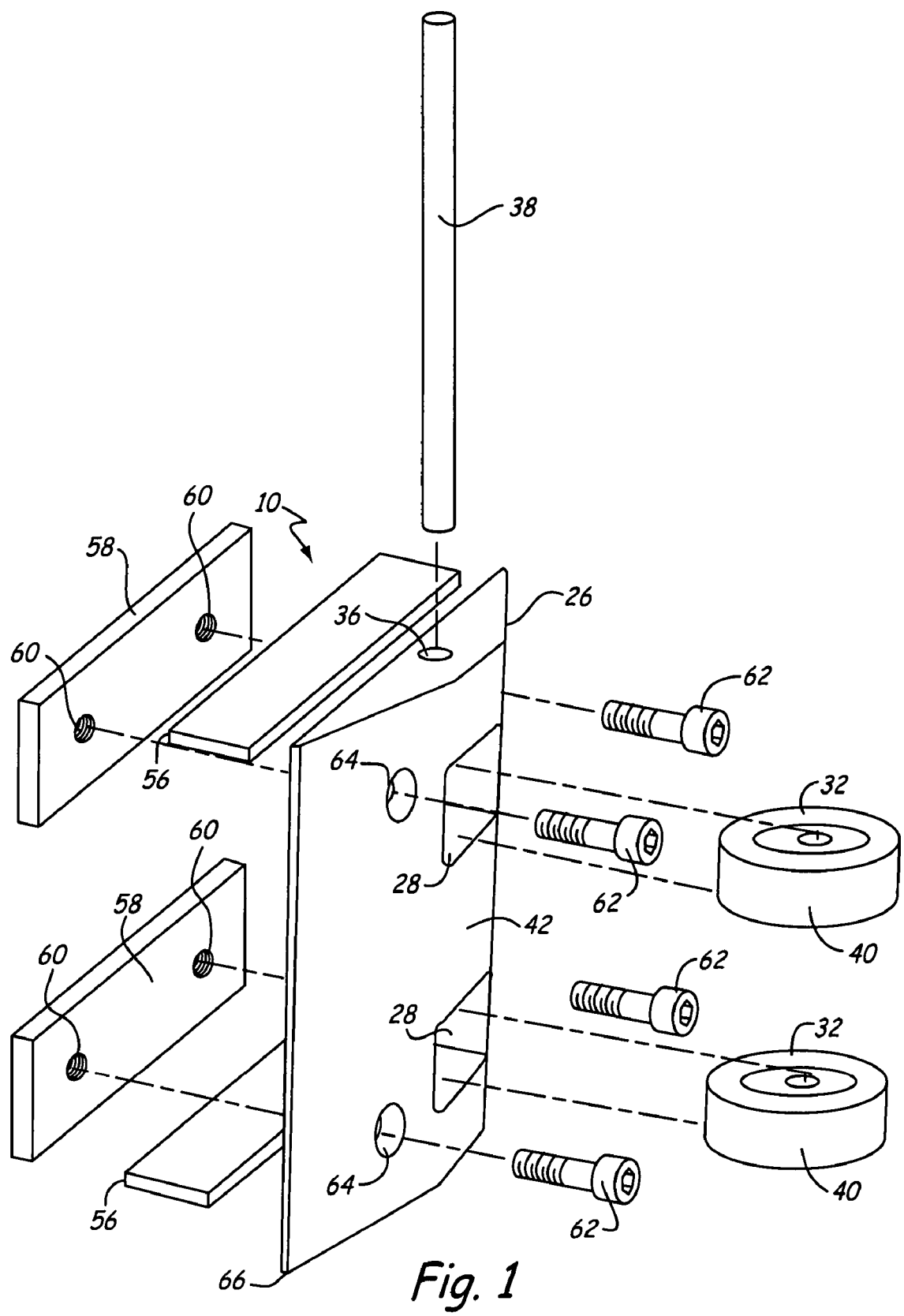
FIG. 1 is an exploded view of a steering device of the present invention.
Figure 2:
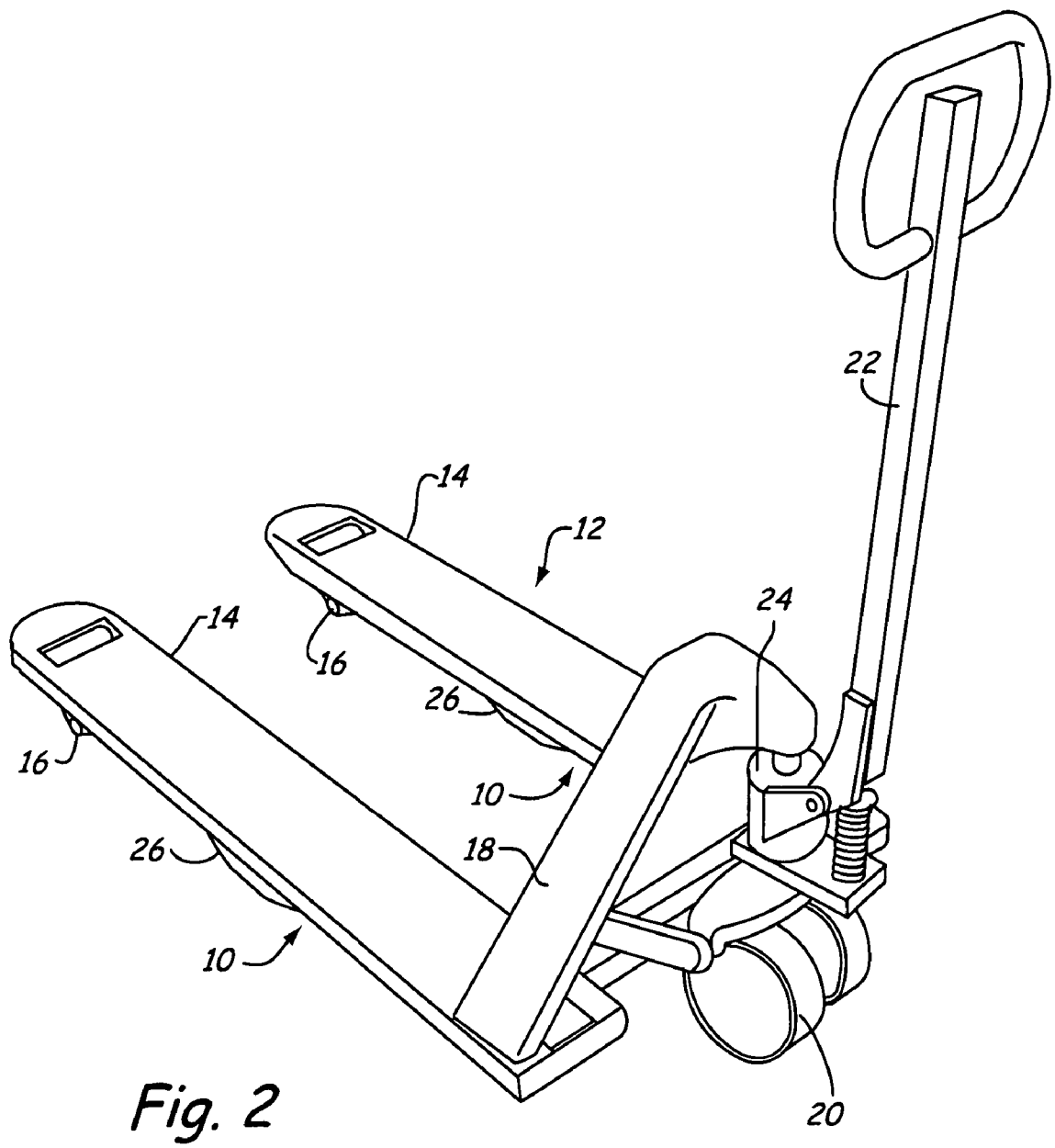
FIG. 2 is a perspective view of a pallet jack implementing the steering device of the present invention.

A steering device of the present invention is generally indicated at 10 in FIG. 1. The steering device 10 is preferably used in conjunction with material handling equipment, for example, a pallet jack 12 as illustrated in FIG. 2. The pallet jack 12, or hydraulic pallet truck, is a material handling device known to those skilled in the art of material handling for moving pallets (not shown) within a work area, such as a warehouse, storage room or within a manufacturing facility. For purposes of the present invention, an exemplary pallet jack 12 includes forked members 14 having extensible rollers 16 attached to an A-frame 18 having a positionable main wheel 20. The main wheel 20 connects to a steering rod 22 which also actuates a hydraulic lifting mechanism 24, operatively connected to the extensible rollers 16 and main wheel 20, for raising and lowering the pallet jack 12. In the lowered position, the pallet jack 12 can be positioned such that the forked members 14 are disposable within a pallet resting on the ground. Actuating the hydraulic lifting mechanism 24 positions the pallet jack 12 toward the raised position resulting in the forked members 14 engaging the pallet and lifting the pallet from the ground, whereby the pallet can be transported to the desired portion of the work area.

Referring back to FIG. 1, the steering device 12 of the present invention includes a housing structure 26 containing wells 28 for receiving ground engageable rollers 32 therein. The housing structure 26 also contains a cylindrical aperture 36 orientated transverse to the direction of the rollers 32 for receiving an axial shaft 38 therethrough. Each roller 32 is disposable onto the axial shaft 38 to secure each roller 32 to the housing structure 26. The positioning of the cylindrical aperture 36, and subsequently the axial shaft 38, is such that will allow each roller 32 to partially dispose within the housing structure 26, permitting an outer surface 40 of each roller 32 to extend past an outermost face 42 of the housing structure 26. When disposed upon the axial shaft 38, each roller 32 is allowed to freely rotate.

Figure 3:
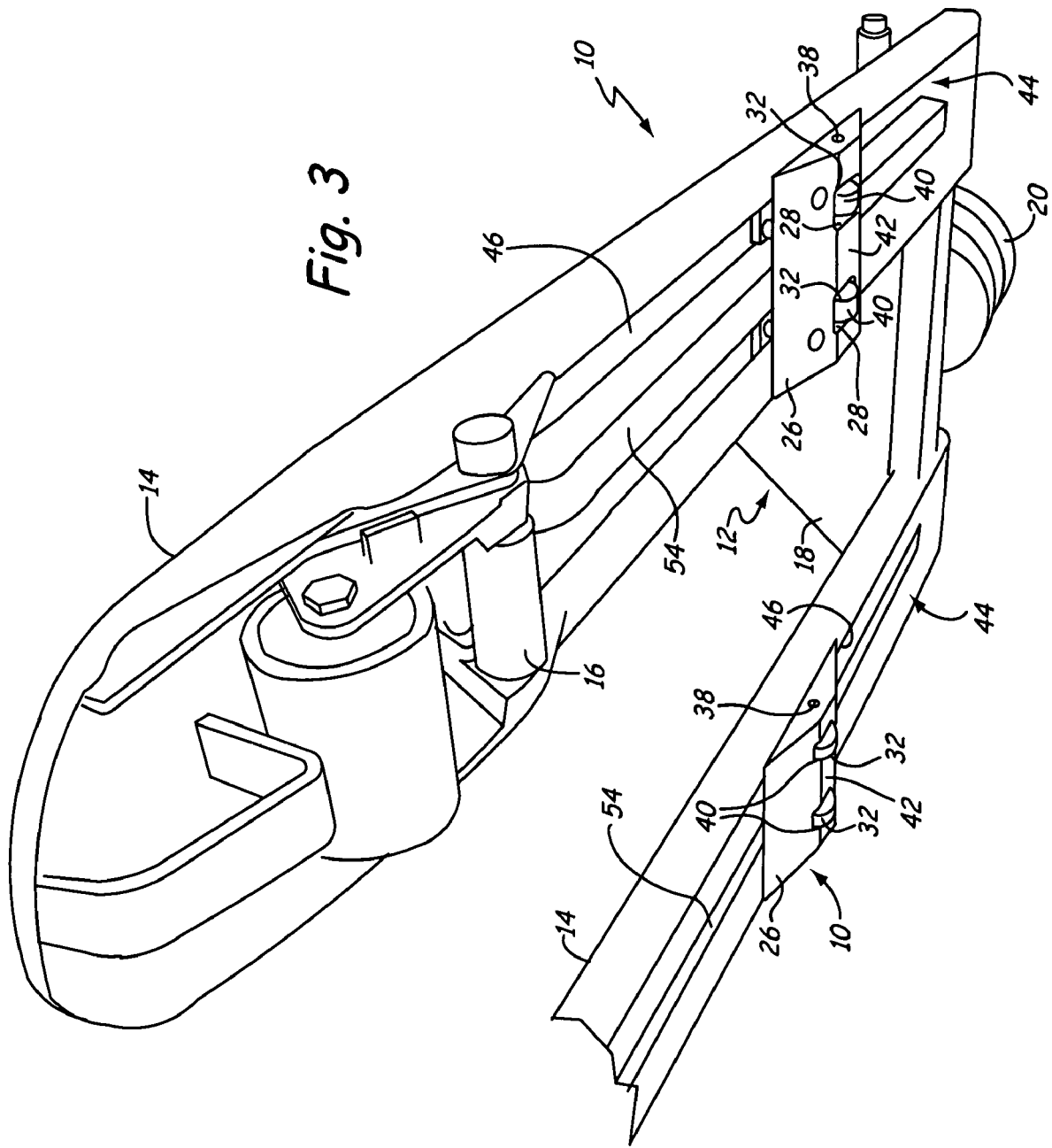
FIG. 3 is a perspective view of an underside of a pallet jack with the steering device of the present invention.

The steering device 10 of the present invention is designed to affix to an underside 44 of each fork member 14, as illustrated in FIG. 3. While it is preferable that a steering device 10 be attached to each fork member 14, it is well within the scope of the present invention to supply only one steering device 10 to a single fork member 14. When implementing the preferred embodiment of a steering device 10 on each fork member 14, it is preferable to position each steering device 10 on the respective fork member 14 directly opposite one another. It is also preferable to position each steering device 10 approximately half the distance between the extensible roller 16 of each arm 14 and the main wheel 20, however, each steering device 10 can be positioned opposite one another at any desirable point along the underside of the respective fork member 14.

Figure 4:
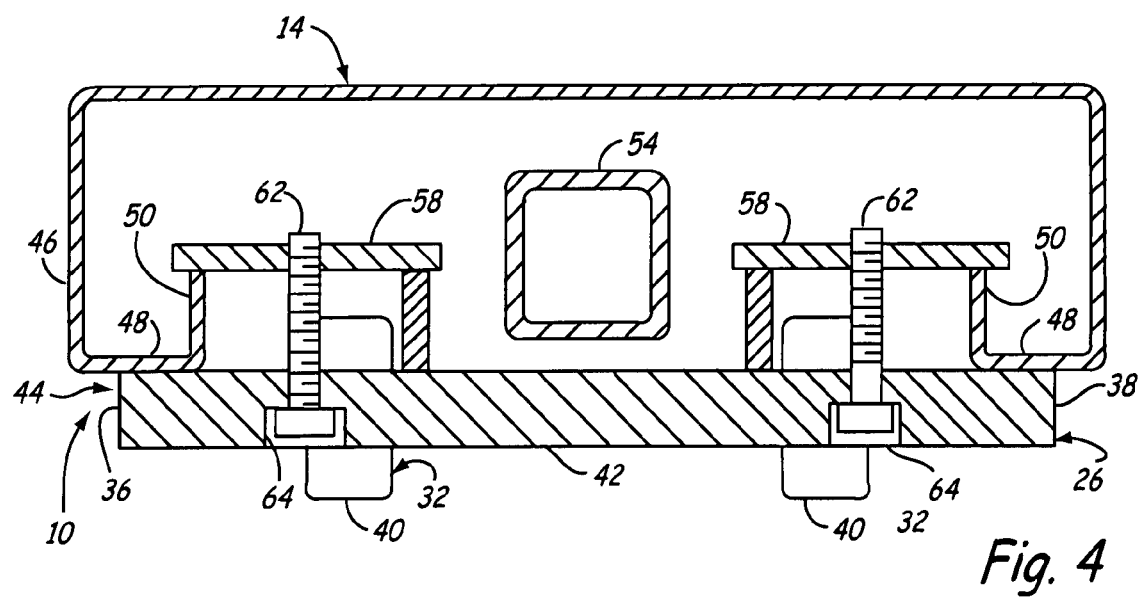
FIG. 4 is a cross-sectional view of the steering device of the present invention taken along lines 4-4 in FIG. 2.

As illustrated in FIG. 4, each fork member 14 is typically formed to include downwardly extending side members 46 to provide overall rigid support to the fork member 14. The downwardly extending side members 14 include flange portions 48 extending therefrom. Each flange 48 includes an upwardly extending rib 50. Disposed along a center underportion 52 of each fork member 14 is a connecting rod 54 which operatively connects the hydraulic lifting mechanism 24 with the respective extensible roller 16. The steering device 10 is designed to frictionally engage the flange members 48 while permitting the connecting rod 54 to travel freely therebetween. To accomplish this, spacer plates 56 dispose between respective locking plates 58. Each locking plate 58 includes threaded apertures 60 for receiving threaded screws 62 which connect each locking plate 58 to the housing structure 26. The housing structure 26 also contains apertures 64 for receiving the threaded screws 62.

Each locking plate 58 engages the rib 50 of the respective flange 48 and the respective spacer plate 56. In turn, an inward face 66 of the housing structure engages the respective flange 48 and respective spacer plate 56. Upon engaging the threaded screws 62 with the housing structure 26 and the respective locking plate 58, each locking plate 58 and the housing structure 26 are urged together and into further engagement against the respective spacer plate 56 and respective rib 50, thereby frictionally engaging the housing structure 26 to the forked member 14. It should be noted, however, that alternative embodiments may have flange members 48 that do not include the upwardly extending rib 50, in which case there is no need for the spacer plate 56, and the locking plate 58 and housing structure 26 directly engage the flange 48 to secure the steering device 10 to the fork member 14. It should also be noted, however, that other means of securing the housing structure 26 to the forked member 14 are well within the scope of the present invention, including welding or gluing the housing structure 26 directly onto the forked member 14, bolting the housing structure 26 directly to the forked member 14 or using an external clamp to secure the housing structure 26 to the fork member 14.

Figure 5:
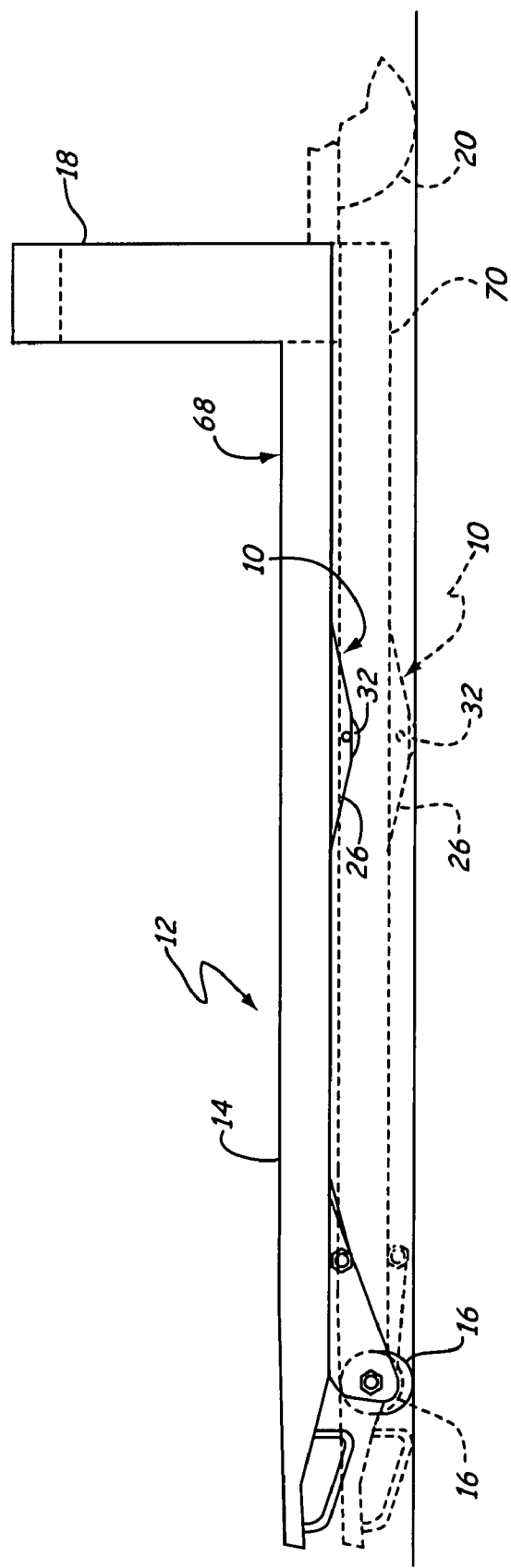
FIG. 5 is a side-view of a pallet jack in a raised position and a lowered position (dashed lines).

Referring now to FIG. 5, the pallet jack 12 is positionable between a raised position 68 and a lowered position 70 (dashed lines). In the raised position 68, the extensible roller 16 of each arm 14 and the main wheel 20 contact the ground and the steering device 10 is disengaged from the ground. This permits the pallet jack 12 to be used in a conventional manner when transporting pallets. As such, the turning radius of the pallet jack 12 while in the raised position 68 is defined by the distance between the main wheel 20 and the extensible rollers 16. However, upon lowering the pallet jack 12, the rollers 32 from each steering device 10 contact the ground, and further actuation from the lifting mechanism 24 causes the respective connecting rod 54 to lift the respective extensible roller 16 even further, causing the extensible rollers 16 to disengage from the ground. At this point, only the rollers 32 of the respective steering device 10 and the main wheel 20 contact the ground. Thus, upon lowering the pallet jack 12 a new turning radius is defined by the distance between the positioning of the steering devices 10 and the main wheel 20. Because the steering devices 10 are positioned closer to the main wheel 20 than the extensible rollers 16 of the pallet jack 12, the turning radius is decreased. The decreased turning radius permits the pallet jack 12 to be more maneuverable, especially in tight or congested spaces.

In operation, when the pallet jack 12 is in the lowered position 70, the steering device 10 is in contact with the ground and the rollers 32 permit the pallet jack 12 to be pushed or pulled in much the same manner as when the extensible rollers 16 are in contact with the ground. However, when in the lowered position 70, the pallet jack 12 is also maneuverable to pivot about the steering devices 10 with relation to the main wheel 20. This facilitates in positioning the front end of the pallet jack 12 to align the front end with pallet. Also, when the steering devices 10 are positioned on each fork member 14 in the preferred position, the turning radius of the pallet jack 12 is approximately halved in comparison to the turning radius of the pallet jack 12 when it is in the raised position 68.

Although the present invention has been described with reference to preferred embodiments, workers skilled in the art will recognize that changes may be made in form and detail without departing from the spirit and scope of the invention.

The invention claimed is:

1. A pallet jack comprising:
  a platform for supporting a load positioned thereon positionable between a raised positioned and a lowered position, the platform having proximal and distal ends;
  a steerable main wheel connected to the proximal end of the platform;
  a distal wheel proximately connected to the distal end of the platform, a first turn radius of the pallet jack defined by the distance between the main wheel and the distal wheel;
  a housing member attached to the underside of the platform; and
  a roller at least partially disposed within the housing member a fixed distance from the platform between the main wheel and the distal wheel, whereupon positioning the platform from the raised position toward the lowered position, the roller engages the ground to facilitate steering of the pallet jack and the distal wheel disengages the ground, whereupon a second turn radius of the pallet jack is defined by the distance between main wheel and the roller, wherein the second turn radius is less than the first turn radius.

2. The pallet jack of claim 1 and further comprising a mechanism operatively linking the main wheel and the distal wheel to raise and lower the platform.

3. The pallet jack of claim 1 wherein the housing member fixedly attaches to the platform.

4. The pallet jack of claim 1 and further comprising a mechanism operatively connected to the main wheel and the distal wheel to raise and lower the platform.

5. A pallet jack comprising:
  a support frame having a first leg and a second leg spaced-apart from one another, the support frame positionable between a raised position and a lowered position;
  a steerable main wheel connected to the support frame proximate the first end;

an extensible wheel connected to the support frame proximate the second end, a first turn radius of the pallet jack defined by the distance between the main wheel and the extensible wheel; and a ground engaging device affixed to an underside of each leg between the main wheel and the extensible wheel, wherein positioning the support frame towards the lowered position the ground engageable device engages the ground and the extensible wheel disengages from the ground, wherein a second turn radius of the pallet jack is defined by the distance between the main wheel and the ground engaging device, wherein the second turn radius is less than the first turn radius.

6. The pallet jack of claim 5 and further comprising a mechanism operatively linking the main wheel and the extensible wheel to raise and lower the platform.

7. The pallet jack of claim 5 wherein the support frame is unitary and further comprising a connecting portion adjoining each leg, the main wheel directly connected to the connecting portion.

8. The pallet jack of claim 5 wherein the ground engaging device comprises:
    a housing member;
    a mechanism to secure the housing member to the underside of the support frame;
    a roller at least partially disposed within the housing member at a fixed position; and
    an axial member disposed within the housing member to rotatably secure the roller to the support frame, wherein the roller does not engage the ground while the support frame is positioned toward the raised position, whereupon positioning the support frame towards the lowered position the roller engages the ground to facilitate steering of the pallet jack.

9. The pallet jack of claim 8 wherein the mechanism of each ground engaging device comprises:
    a fastening plate connectable to the housing member and engageable to the respective first and second leg; and
    a fastener connecting the housing member to the fastening plate to urge the fastening plate and the housing into frictional engagement with the respective first and second leg.

10. The pallet jack of claim 9 and further comprising a spacer plate positionable between the housing member and the fastening plate to facilitate the frictional engagement of the fastening plate and housing member to the respective first and second leg.

11. The pallet jack of claim 5 wherein positioning the support frame towards the lowered positioned, the position of the ground engaging device relative to the support frame remains constant.

12. A pallet jack comprising:
    a support frame having first and second spaced-apart legs, the support frame positionable between a raised position and a lowered position;
    a main steerable wheel connected to the support frame proximate a first end;
    a first extensible wheel connected to the first leg of the support frame proximate a second end;
    a second extensible wheel connected to the second leg of the support frame proximate the second end; and
    a ground engaging device attached to an underside of each leg between the main wheel and the respective extensible wheel, wherein positioning the support frame from the raised position towards the lowered position each ground engaging device engages the ground and each extensible wheel disengages the ground, whereby the pallet jack has a lesser turn radius in the lowered positioned than in the raised position.

13. The pallet jack of claim 12 wherein each ground engaging device comprises:
    a housing member attachable to an underside of each leg;
    a roller at least partially disposed within the housing member; and
    an axial member disposed within the housing member and the roller to rotatably secure the roller to the housing member, wherein the roller does not engage the ground while the support frame is positioned toward the raised position, whereupon positioning the support frame towards the lowered position the roller of each ground engaging device engages the ground to facilitate steering of the pallet jack.

14. The pallet jack of claim 13 and further comprising:
    a fastening plate connectable to the housing member and engageable to the respective first and second leg; and
    a fastener connecting the housing member to the fastening plate to urge the fastening plate and the housing into frictional engagement with the respective first and second leg.

15. The pallet jack of claim 14 and further comprising a spacer plate positionable between the housing member and the fastening plate to facilitate the frictional engagement of the fastening plate and housing member to the respective first and second leg.

16. The pallet jack of claim 12 and further comprising a mechanism operatively linking the main wheel and each extensible wheel to raise and lower the platform.

* * * * *